Oct. 30, 1951  J. GEIER  2,573,429
MEANS FOR FORMING CONTAINERS
Original Filed Dec. 3, 1942  2 SHEETS—SHEET 1

INVENTOR.
JAMES GEIER
BY
Richards & Geier
ATTORNEYS

Oct. 30, 1951 J. GEIER 2,573,429
MEANS FOR FORMING CONTAINERS
Original Filed Dec. 3, 1942 2 SHEETS—SHEET 2
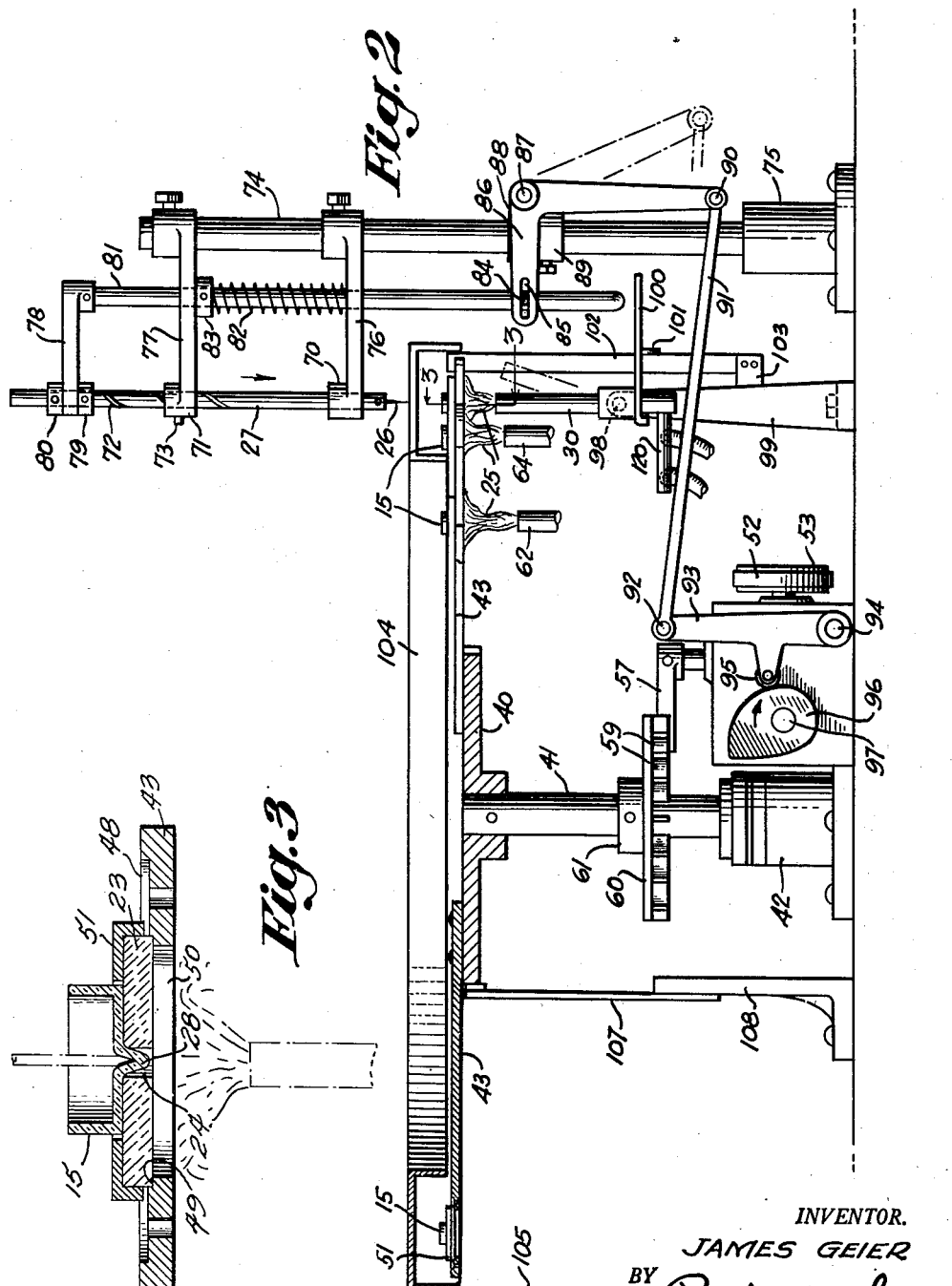
INVENTOR.
JAMES GEIER
BY Richard Geier
ATTORNEYS Patented Oct. 30, 1951

2,573,429

UNITED STATES PATENT OFFICE 2,573,429

MEANS FOR FORMING CONTAINERS

James Geier, Troy, N. Y.; Bertha R. Neeb, executrix of estate of James Geier, deceased, assignor to Geier & Bluhm, Inc., Troy, N. Y., a corporation of New York Original application December 3, 1942, Serial No. 467,697. Divided and this application April 18, 1945, Serial No. 589,024

7 Claims. (Cl. 49—7)

This invention relates to machines for shaping glass containers. The invention is particularly concerned with the manufacture of spirit levels of the circular type which are used on a large variety of instruments and machines, for example in the war industry and the like.

An object of the present invention is the provision of means for the mass production of circular levels, the containers of which are uniform size and shape.

Another object is to simplify and make less expensive the manufacture of circular levels and to produce levels the containers of which have strong, uniformly annealed walls.

Other objects of the present invention will become apparent in the course of the following specification.

The object of the present invention may be realized by using glass cups of regular form, which have no passages and by providing projecting tips in such cups, preferably by heating them and then employing a plunger for the formation of the tips. Then the cups are cooled and thereafter the ends of the tips are ground off so that passages are provided through which the cups may be filled. Finally, the open ends of the tips are sealed again by fusion.

The mass production of such cups may be attained by the use of a machine having a number of cup-carrying supports which are moved stepwise to subject the cups to a preliminary heating, to provide the tips in the cups and to anneal the cups.

The invention will appear more clearly from the following detailed description when taken in connection with the accompanying drawings showing, by way of example only, preferred embodiments of the inventive idea.

In the drawings:

Figure 2 shows the machine in side elevation, partly in section; and

Figure 3 is a sectional view along 3—3 of Figure 2, but on an enlarged scale.

Figure 1:
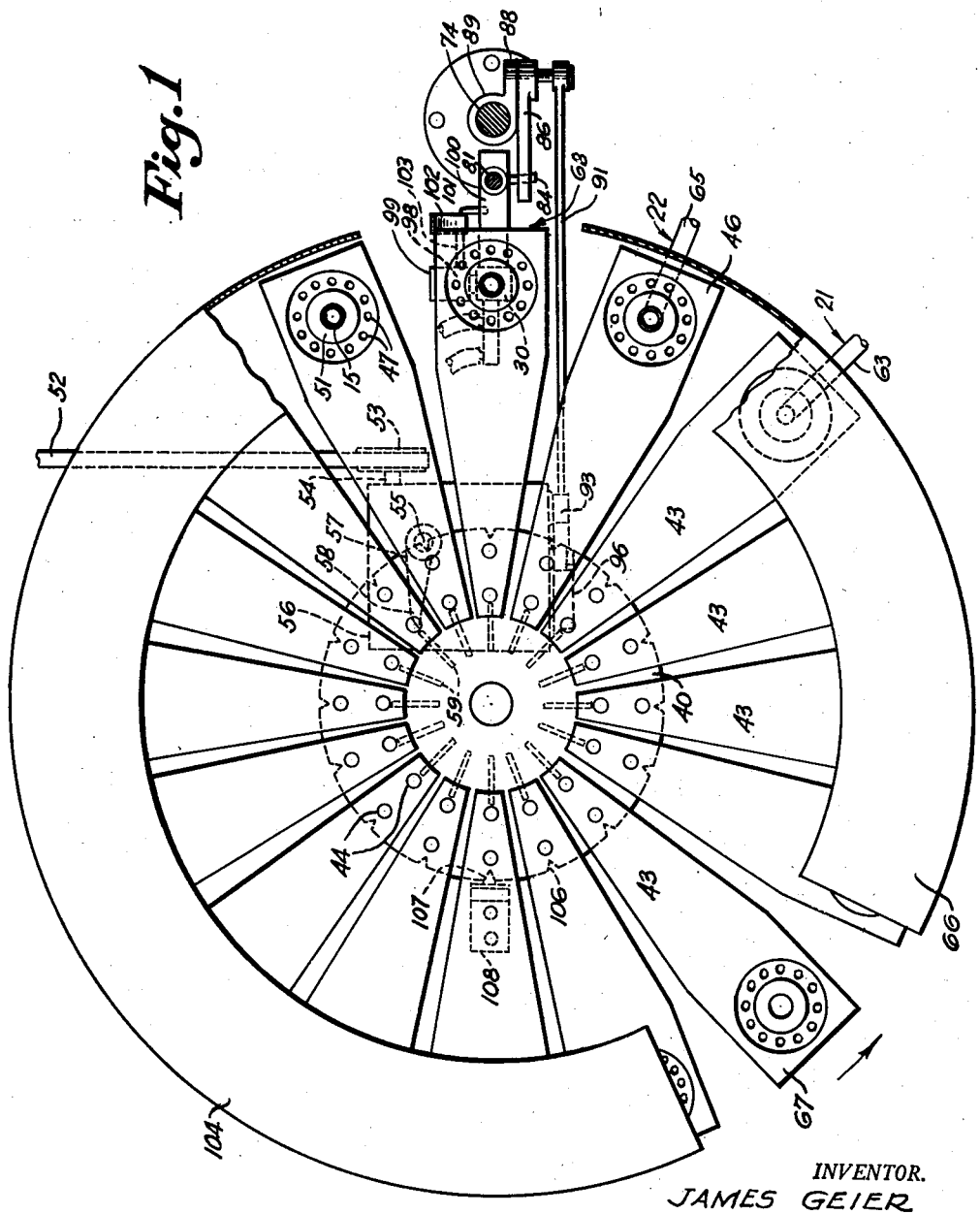
Figure 1 is a top view of a machine, with some parts broken off or shown in section.

The machine shown in the drawings may be used in mass production for the purpose of forming the tips 28 in the cups 15.

The machine comprises a supporting disc 40 mounted upon a vertical shaft 41 which is firmly connected with the disc 40 and the lower end of which is carried by a heavy bearing 42.

The disc 40 carries a plurality of radial supports 43 inner ends of which are attached to the disc by bolts 44. Each of the supports 43 includes an arm and a substantially rectangular end portion 46 provided with circularly disposed heat transmitting ventilating openings 47. The upper surface of the support portion 46 has a round recess 48 enclosing a deeper recess 49 which serves as a seat for the refractory disc 23. An opening 50 is situated below the disc 23.

The disc 23 which has the guiding opening 24, carries an annular cover 51 serving as a seat for the cup 15.

It is apparent that all the supports 43 are of the same construction and that the disc 40 may be provided with any suitable number of supports 43.

The machine is driven by a motor which is not shown in the drawings and which drives an endless belt 52 passing over a pulley 53. The pulley 53 is keyed upon a horizontal shaft 54 which is operatively connected with a vertical shaft by means of a gear reduction unit 56. An arm 57 having a reduced end 58 is mounted upon the upper end of the shaft 55 and rotates along with the shaft.

The stepwise turning movement of the shaft 41 carrying the disc 40 is accomplished by the use of radial fins or plates 59 which are engaged one after the other by the end 58 of the rotating arm 57 and which are carried by a disc 60. The disc 60 is integral with a hub 61 which is firmly mounted upon the shaft 41.

It is apparent that the end 58 of the arm 57 will strike one of the fins 59 in the course of the rotary movement of the arm 57 and will turn the shaft 41 until the arm 57 is moved out of engagement with the fin. Then the arm 57 will strike the next fin, and so forth. The disc 40 is provided with uniformly disposed notches 106; a resilient rod 107 carried by a bracket 108 is adapted to engage each of these notches in turn. Due to this arrangement and to the proper selection of the fins 59 and the arm 57, a cup 15 will be moved into the position occupied by the preceding cup in the course of each step of the stepwise movement.

The cups 15 are subjected to the first preheating operation at the location 21 by means of a gas burner 62 of the usual type which is connected by a pipe 63 to a source of gas not shown in the drawings.

A cup 15 subjected to the first preheating at the location 21 is moved by the next step of the stepwise movement to the location 22 wherein the cup is subjected to the second preheating by a gas burner 64 supplied with gas through a pipe 65. The two burners 62 and 64 are immovably mounted upon a suitable support (not shown).

The heat supplied by the burners 62 and 64 is preserved and gradually transmitted to the cups through the use of a curved cover 66 extending over several cups and over the locations 21 and 22. The cover 66 is supported in the illustrated position by any suitable means (not shown). One end of the cover 66 is situated close to the location 67 wherein treated cups are removed and fresh cups 15 are placed upon the supports 43 by an operator. The other end of the cover 66 is situated close to the location 68 wherein a third burner 30 and the plunger 26 are located.

The plunger 26 is firmly held in the holder or rod 27 which moves down and up and which is guided by sleeves 70 and 71. The plunger 26 turns in the course of its reciprocatory movement due to the provision of a helical groove 72 and a pin 73 situated in that groove. The pin 73 is carried by the sleeve 71 while the groove 72 is formed in the rod 27.

A vertical column or stand 74 is carried by a base 75 and carries arms 76 and 77 which are integral with the sleeves 70 and 71, respectively.

The upper end of the rod 27 is connected to an end of a horizontal arm 78 by means of collars 79 and 80 which are firmly connected to the rod 27. The other end of the arm 78 is keyed upon the upper end of a vertical rod 81 which extends through openings provided in the arms 76 and 77. The rod 81 reciprocates vertically and is returned to the position shown in Figure 2 by a coiled spring 82 which surrounds the rod 81 and which is situated between the arms 76 and 77. The upper end of the spring 82 presses against a stop or collar 83 which is keyed upon the rod 81. The other end of the spring 82 is in engagement with the arm 76.

A pin 84 is carried by the rod 81 close to its lower end and extends through a slot 85 provided in one end of an angular crank lever 86. The crank lever 86 is pivoted at 87 to a bracket 88 which is firmly connected with a sleeve 89 mounted upon the stand 74.

The other end of the crank lever 86 is connected by a pivot or pin 90 to one end of a connecting rod 91. The other end of the rod 91 is connected by a pivot 92 to one end of a cam lever 93 which is pivoted at 94 and which carries a roller 95. The roller 95 is in engagement with a cam 96 keyed upon a shaft 97. The shaft 97 is situated in the gear reduction unit 56 and is driven from the main shaft 54.

The continuously rotating cam 96 swings periodically the cam lever 93 which moves the crank lever 86 to the position shown by broken lines in Figure 2, thereby moving downwardly the rod 81 connected therewith the holder 27. The spring 82 returns the various parts back to the original position as soon as the actuating surface of the cam is moved away from the roller 95.

The flame 25 of the burner 30 should be withdrawn at the time when the plunger 26 forms the tip 28.

For this purpose, the burner 30 carries a pivot 98 which is mounted in an upright or bracket 99. The burner 30 also carries an elongated plate or lever 100 the outer end of which is situated directly below the rod 81. The rod 81 in the course of its downward movement will push the lever 100 downwardly and thereby swing or tilt the burner 30.

The burner 30 is maintained for a while in the tilted position after the withdrawal of the rod 81 due to the provision of a hook 101 which engages the upper surface of the lever 100 in the depressed position of the latter. The hook 101 is integral or firmly connected with a resilient upwardly extending rod 102 the lower end of which is carried by a bracket 103 which is connected to the upright 99. As shown in Figure 1, the resilient rod 102 has an upper end which is engaged by an edge of a support 43 and is pressed outwardly by it in the course of the turning movement of the support. Then the hook 101 is moved out of engagement with the lever 100, thereby freeing the burner 30. A pipe 120 which supplies gas and air to the burner 30 is of such weight that it will cause a movement of the burner back to its upright position as soon as the lever 100 is freed.

As soon as a support 43 is moved out of engagement with the resilient rod 102, the rod 102 will return to its original position in which the hook 101 is situated in the path of the lever 100.

An annealing cover 104 having the form of a half ring, extends over the cups 15 between the locations 67 and 68. The cover 104 is supported by legs 105. The purpose of the cover 104 is to prevent a rapid escape of heat and thereby provide for a uniform annealing of the cups 15 traveling under the cover 104.

The machine is operated as follows:

When the motor is started, its rotation will be transmitted by the belt 52 and the pulley 53 to the shaft 54, the gears in the gear unit 56 and the shaft 55 carrying the arm 57. The arm 57 will strike the fins 59 in turn in the course of its rotation, thereby moving stepwise the shaft 41 carrying the disc 40 and the supports 43. The rod 107 engaging the notches 106 of the disc 40 regulates the proper extent of the stepwise motion.

An operator is situated at the location 67 between the covers 104 and 66; he removes a treated cup as it emerges from the cover 104 and inserts in its place upon the disc 23 of a support 43 a cup 15. In the course of the continued stepwise movement of the supports 43 this cup will travel under the cover until it reaches the location 21 where it is preheated by the burner 62. The next step will bring the cup to the location 22 where it is subjected to a second preheating by the burner 64. Then the cup is moved to the location 68 where it is heated by the burner 30.

In the meantime, the gears in the gear unit 56 turn the cam shaft 97 carrying the cam 96. While a cup 15 is situated in the location 68, the cam 96 will swing the lever 93 which is connected by the rod 91 with the crank lever 86. The lever 86 will move downwardly the rod 81 and the rod 27 connected therewith, compressing the spring 82. The rod 27 carrying the plunger 26 turns as it moves downwardly, due to the provision of a pin 73 engaging the spiral groove 72.

The rod 81 will strike the lever 100 and thereby swing the burner 30 away from the cup 15. The hook 101 will engage the lever 100 and thus maintain the burner 30 for a while in the inclined position.

In the meantime, the plunger 26 will engage the bottom of the cup 15 and will form the tip 28 in the cup.

As soon as the cam 96 ceases to exert pressure upon the lever 93, the spring 82 will expand and move upwardly the rods 81 and 27, thereby returning the crank lever 86, the rod 91 and the lever 93 to their original positions. The upward movement of the rod 81 is stopped by the engagement of the ring 83 with the arm 77.

When the stepwise turning movement of the supports 43 is resumed, an edge of the support 43 situated at the location 68 will bend the resilient rod 102, thereby withdrawing the hook 101 from engagement with the lever 100. The weight of the pipe 120 will then move the burner 30 back to its vertical position.

A cup leaving the location 68 will travel under the cover 104 and will be thoroughly annealed in the course of its movement. The cup is removed by the operator stationed at the location 67.

It is to be understood that the invention is not intended to be restricted to any particular construction, as the same may be modified without departing from the spirit or scope of the claimed invention.

This application is a division of my co-pending patent application, Serial No. 467,697, filed December 3, 1942, now Patent No. 2,385,071, issued September 18, 1945.

What is claimed is:

1. In the manufacture of levels and other glass containers for fluids, a machine comprising a plurality of supports for the containers, each support having a guiding opening formed therethrough, a carrier for the supports, means intermittently moving the carrier, at least one source of heat situated in the path of movement of the container-carrying supports, a reciprocal plunger situated substantially close to the source of heat and adapted to form a projecting tip in the container in coaction with the guiding opening through the support, means connected with the means intermittently moving the carrier for operating the plunger, and means actuated by the plunger operating means for removing the source of heat while the tip is being formed.

2. In the manufacture of levels and other glass containers for fluids, a machine comprising a plurality of supports for the containers, each support having a guiding opening formed therethrough, a carrier for the supports, means intermittently moving the carrier, two sources of heat situated one after the other in the path of movement of the container-carrying supports, a third source of heat situated in the path of movement, a reciprocal plunger situated substantially close to the third source of heat and adapted to form a projecting tip in the container in coaction with the guiding opening through the support, means connected with the means intermittently moving the carrier for operating the plunger, and means actuated by the plunger operating means for removing the source of heat while the tip is being formed.

3. In the manufacture of levels and other glass containers for fluids, a machine comprising a rotary disc, a plurality of radial supports having inner ends carried by the disc and outer ends adapted to carry glass containers, a guiding opening through each of the outer ends, means for intermittently turning the disc, heating means situated in the path of movement of the glass containers, a cover extending over the heating means, a reciprocal plunger situated substantially close to the heating means and adapted to form a projecting tip in the container in coaction with the guiding opening through the support, means connected with the means intermittently moving the disc for operating the plunger, and an annealing cover extending over the path of movement of the glass containers carrying the projecting tips.

4. A machine according to claim 3 in which the means for intermittently turning the disc comprises a shaft for the disc, a plate carried by the shaft, a plurality of radial fins carried by the plate, and a rotary arm having an end adapted to engage the fins one after the other whereby a stepwise turning movement is imparted to the shaft.

5. A machine according to claim 3 in which the outer end of each support has a central opening formed therein, the opening being recessed to constitute a seat and further having a plurality of ventilating openings circularly formed therein about the central opening, a refractory disc for the seat, the disc having a central guiding opening formed therethrough and adapted to coact with the plunger, and a cover enclosing the edges of the disc, the cover having a central opening formed therein and adapted to receive a glass container.

6. In the manufacture of levels and other glass containers for fluids, a machine comprising a rotary disc, a plurality of radial supports having inner ends carried by the disc and outer ends adapted to carry glass containers, a guiding opening through each of the outer ends, means for intermittently turning the disc, a heat-generating burner situated in the path of movement of the glass containers, a plunger situated substantially close to the burner, means reciprocating the plunger and adapted to form a projecting tip in the container in coaction with the guiding opening through the support, said means comprising a holder carrying the plunger, a rod extending parallel to the holder, an arm interconnecting the holder and rod, guides for the holder and rod and adapted to maintain the holder and rod slidable in a plane perpendicular to the plane of the supports, a stand for the guides, means maintaining the holder and rod normally at the top of the guides under tension, a swingable crank lever having one end pivotally connected to the free end of the rod, a connecting rod having one end pivotally connected to the free end of the crank lever, a cam lever having one end pivotally connected to the free end of the connecting rod, and a cam driven by the means intermittently rotating the disc and actuating the cam lever when the guiding opening through a support is aligned with the plunger; the machine further comprising a pivot carried by the burner, a support carrying the pivot, an arm carried by the burner and engaged by the rod during its downward movement to swing the burner from its position, and means locking the burner in an inclined position while the projecting tip is being formed by the plunger.

7. A machine according to claim 6 in which the means locking the burner in an inclined position comprises a resilient arm, a hook carried by the arm and adapted to engage the arm carried by the burner in its inclined position to lock the burner, the resilient arm having an end engaged and moved by the radial supports in the course of their intermittent movement to free the hook from engagement with the arm carried by the burner.

JAMES GEIER.

REFERENCES CITED

The following references are of record in the file of this patent:

UNITED STATES PATENTS

| Number | Name | Date |
|---|---|---|
| 557,105 | Bridges | Mar. 31, 1896 |
| 628,030 | Parker | July 4, 1899 |
| 1,597,916 | Madden et al. | Aug. 31, 1926 |
| 1,967,766 | De Lano | July 24, 1934 |
| 2,146,572 | Hahn et al. | Feb. 7, 1937 |
| 2,230,075 | Chase | Jan. 28, 1941 |
| 2,348,905 | Hopfield | May 16, 1944 |
| 2,414,587 | Eisler | Jan. 21, 1947 |
| 2,427,712 | Casler et al. | Sept. 23, 1947 |